June 2, 1925.
C. A. MYERS
1,540,219
VULCANIZING APPARATUS
Filed Jan. 17, 1921
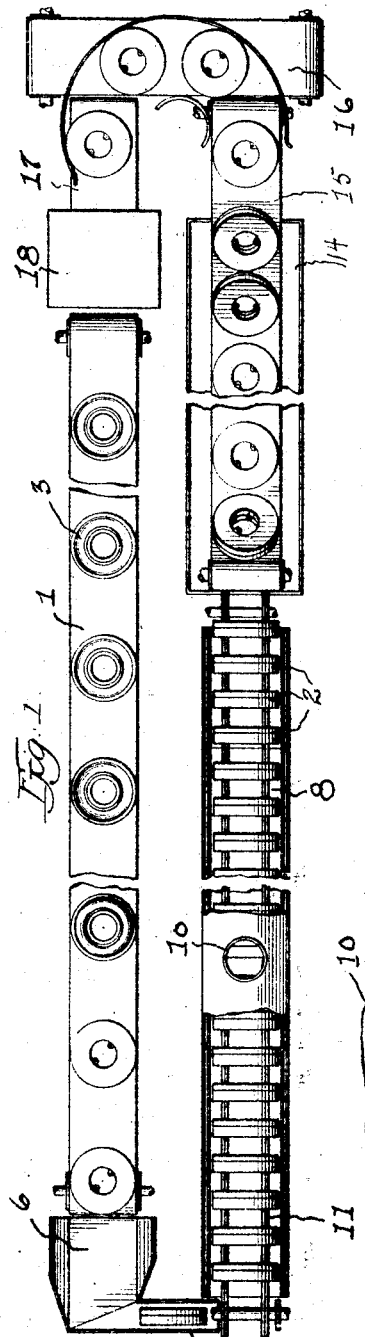
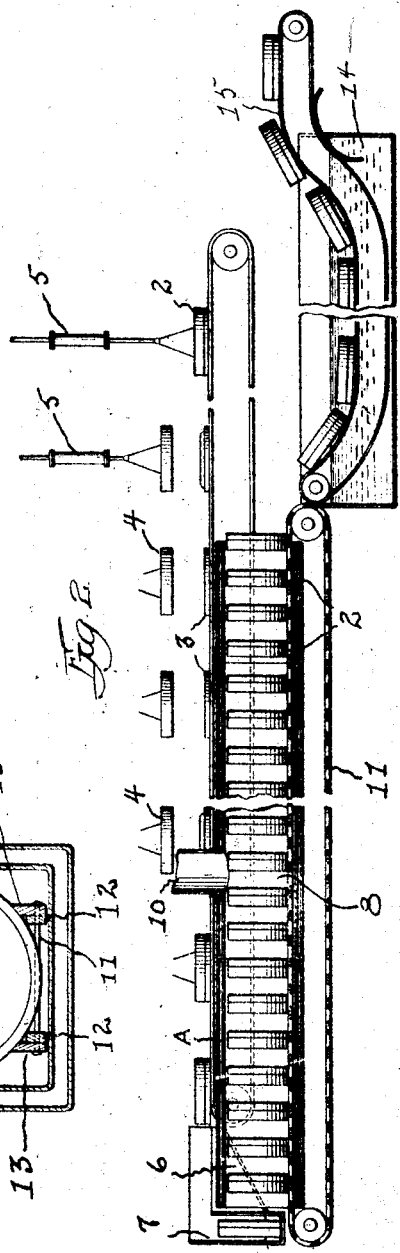
Inventor
Carmon A. Myers Patented June 2, 1925.

1,540,219

UNITED STATES PATENT OFFICE.

CARMON A. MYERS, OF AKRON, OHIO, ASSIGNOR TO THE FIRESTONE TIRE AND RUBBER COMPANY, OF AKRON, OHIO, A CORPORATION OF OHIO.

VULCANIZING APPARATUS.

Application filed January 17, 1921. Serial No. 437,791.

*To all whom it may concern:*

Be it known that I, CARMON A. MYERS, a citizen of the United States, residing in Akron, in the county of Summit and State of Ohio, have invented certain new and useful Improvements in Vulcanizing Apparatus, of which the following is a specification.

This invention relates to an apparatus for vulcanizing rubber articles and is particularly directed to the manufacture of rubber tires, it being the purpose of the invention to enable tires to be cured more quickly and economically than has been possible in prior constructions. The apparatus is designed to obtain the maximum production of tires with a comparatively small equipment, it being arranged so that the molds are engaged in the manufacture of tires at all times.

By the apparatus herein shown, the mold sections are handled entirely by machinery so that the manual labor connected with the vulcanizing of the tires is reduced to removal of the vulcanized tires, the insertion of the uncured tires and the securing together of the two halves of the mold.

The apparatus is so designed and arranged that the molds are in travel at all times, the vulcanizing being carried on in a tunnel like vulcanizer. By this means a maximum production is secured.

The showing in the drawings is not detailed, as the invention resides broadly in the assembly of elements for handling the molds and the details are non-essential and may be varied or altered as circumstances seem to require.

In the drawings:

Fig. 1 is a view in plan of the apparatus or plant for vulcanizing the tires.

Fig. 2 is an elevation of the entire plant shown in Fig. 1.

Fig. 3 is a cross section through the vulcanizing tunnel or chamber.

The apparatus comprises a main conveyor or mold carrier —1— on which the molds are supported in horizontal position and over which the upper half of the mold is lifted, the tire removed, a green or unvulcanized tire put in place in the mold and the mold closed and locked. The molds are indicated by the numeral —2—, the lower half bearing the numeral —3— and the upper half the numeral —4—.

Over the conveyor —1— is arranged a series of travelling lid lifting devices, indicated by the numeral —5—, which are constructed in the manner well known in the art, so as to move over the conveyor —1— at the same speed. When the molds have been "cracked" or opened enough to enable the upper half to be lifted away from the lower half,—the particular lifting device which is above the mold, is attached to it by means of lugs —25— and the upper half is raised and caused to travel with but above the lower half. At the far end of the conveyor, the lid or upper half is lowered on to the lower half and during the interval between the lifting and lowering of the lid, the cured or vulcanized tire is removed, the mold cleaned and a fresh or unvulcanized tire inserted in its place.

After the upper half is lowered onto the lower half the two halves are securely locked together so as to provide the necessary pressure in the vulcanization of the tire.

The mold, securely clamped together with the unvulcanized tire within it, is discharged on the far side of the conveyor —1— to an inclined chute, or conveyor —6— down which it moves to a second conveyor or chute —7— at right angles thereto. In passing from the conveyor —1— to the conveyor —7— in the chute or conveyor —6— the mold is turned from a horizontal to a vertical postion so that it rolls down to the vulcanizer conveyor to be described.

Parallel with the conveyor —1— is a tunnel or chamber —8— in which the vulcanizing of the tire takes place. The chamber is a long tunnel like structure of a cross section closely conforming to the mold, and is arranged to be heated in any suitable manner, a jacketed wall —A— being shown which may be used for the passage of a heating medium, if desired. The tunnel is preferably, although not necessarily in sections, the sections at about the midway point of the tunnel being the hottest.

At about the center of the tunnel is constructed a flue —10— by means of which a draft is created tending to draw the hot air toward the center of the chamber.

Passing the length of the chamber —8— is a conveyor —11— the lower run of which returns beneath the chamber, the receiving point being at the discharge end of the chute or conveyor —7— so that the molds roll into the conveyor in a vertical position. The conveyor —11— may be of any approved construction it being only essential that it be arranged to carry the molds in vertical position. The conveyor shown in the drawings comprises parallel chains —12— in conjunction with side supporting bars or strips —13— which support the molds on their edges so that they are prevented from overturning.

By turning the molds from horizontal to vertical position, I am enabled to shorten or condense the length of the curing tunnel or chamber so that the apparatus is more practical, as a conveyor in which the molds are horizontal would necessarily be much longer and the heat would not be so advantageously used.

It will be understood that the arrangement of the curing chamber provides for a gradual raise in the temperature of the molds and contents up to the curing point, and after curing a gradual decrease in temperature as they near the discharge end of the chamber. The travel of the molds is conducted slowly enough so that the time consumed in the heating up, curing and cooling is sufficient to obtain the best results in vulcanization.

At the discharge end of the vulcanizing chamber is arranged a tank or bath of water —14— or other cooling medium, into which the molds are lowered by a cooling conveyor —15— by which the molds are cooled sufficiently to enable them to be handled. Any suitable means may be provided for lowering the molds from a vertical position to a horizontal position on the conveyor —15— but such a device is not an essential part of this invention and may take any suitable form or may be omitted if desired.

The molds travel through the cooling bath or trough for a sufficient distance and are then raised out of the same and passed on to a transfer conveyor —16— which moves them over to a short conveyor —17— leading to the conveyor —1— and discharging the molds thereon.

Before the molds reach the conveyor —1— they pass into any suitable or desirable form of mold opening or cracking device —18—. This may be in the form of a magnetic opener or separator which will magnetically hold and separate the two halves of the mold. The particular form or design of separator is not essential to my invention and an apparatus for this purpose may be omitted entirely if desired, it being the practice in factories at present to start or "crack" the molds by a crow bar or similar implement.

After leaving the opener or starter the molds pass on to the conveyor —1— where they are opened and begin again the circuit which has been described.

It will be seen that by the use of the apparatus herein shown, a series of molds are kept in constant circulation and are at all times employed in useful and productive work, and that the labor connected with the handling of the molds is reduced to a minimum.

Changes and modifications may be made in specific embodiments of this invention and variation in the arrangement of the parts may be made without affecting the invention or sacrificing any of its benefits.

I claim:

1. A vulcanizing apparatus for use with molds embodying annular mating sections comprising, an elongate heating chamber having an entrance end, co-operating conveyor elements operable to transport the molds in a substantially horizontal plane toward the entrance end of the chamber said conveyors embodying means for separating and assembling the respective sections of certain molds as they are being transported, a conveyor adapted to traverse the chamber, and a chute adapted to feed the assembled molds from said first conveyors to said second conveyors and to turn them into an upstanding position during such feeding operation.

2. A vulcanizing apparatus for use with molds embodying annular mating sections comprising, an elongate heating chamber having an entrance end, co-operating conveyor elements operable to transport the molds in a substantially horizontal plane to said entrance end of the chamber said conveyors embodying means for separating and assembling respective sections of certain molds as they are being transported, a second conveyor in the chamber disposed at a lower level than the co-operating conveyor elements, and an inclined chute adapted to feed the molds from the co-operating conveyors to the second conveyor and to turn them during the feeding operation into a position to roll upon said second conveyor.

3. A vulcanizing apparatus for use with molds embodying annular mating sections comprising, an elongate chamber having an entrance end, co-operating conveyor elements operable to transport the molds in a substantially horizontal plane to the entrance end of the chamber said conveyors embodying means for separating and assembling the respective sections of certain molds as they are being transported, a second conveyor in the chamber disposed at a lower level than said co-operating conveyors, an inclined chute adapted to feed the molds from the first conveyors to the second conveyor and to turn them during the feeding operation into an upright position to roll upon said second conveyor, and means upon the second conveyor for retaining the molds in an upright position.

4. A vulcanizing apparatus for use with molds embodying annular mating sections comprising, an elongate heating chamber including an entrance end and means for concentrating heat throughout a predetermined area thereof, co-operating conveyor elements operable to transport the molds in a substantially horizontal plane to the entrance end of said chamber said conveyor embodying means for separating and assembling the respective sections of certain molds as they are being transported, a second conveyor in the chamber disposed at a lower level than the co-operating conveyors, means adapted to feed the molds from the first conveyors to the second conveyor and to turn them into an upright position during such feeding operation, and means upon the second conveyor for retaining the molds in an upright position thereon.

CARMON A. MYERS.